(12) United States Patent
Wei et al.

(10) Patent No.: US 12,247,105 B2
(45) Date of Patent: *Mar. 11, 2025

(54) THERMALLY INITIATED ACID CATALYZED REACTION BETWEEN SILYL HYDRIDE AND ALPHA-BETA UNSATURATED ESTERS

(71) Applicant: Dow Silicones Corporation, Midland, MI (US)

(72) Inventors: Yanhu Wei, Midland, MI (US); Steven Swier, Midland, MI (US); Zhenbin Niu, Midland, MI (US); Nanguo Liu, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 762 days.

This patent is subject to a terminal disclaimer.

(21) Appl. No.: 17/599,755

(22) PCT Filed: Jun. 2, 2020

(86) PCT No.: PCT/US2020/035640
§ 371 (c)(1),
(2) Date: Sep. 29, 2021

(87) PCT Pub. No.: WO2020/247333
PCT Pub. Date: Dec. 10, 2020

(65) Prior Publication Data
US 2022/0169797 A1 Jun. 2, 2022

Related U.S. Application Data

(60) Provisional application No. 62/856,777, filed on Jun. 4, 2019.

(51) Int. Cl.
C08G 77/08 (2006.01)
B01J 31/14 (2006.01)
C08G 77/00 (2006.01)
C08G 77/12 (2006.01)
C08G 77/20 (2006.01)

(52) U.S. Cl.
CPC ............ C08G 77/08 (2013.01); B01J 31/146 (2013.01); C08G 77/12 (2013.01); C08G 77/20 (2013.01); C08G 77/70 (2013.01)

(58) Field of Classification Search
CPC .................................................. C08G 77/08
USPC ........................................................ 528/31
See application file for complete search history.

(56) References Cited

U.S. PATENT DOCUMENTS

| 4,254,271 | A | 3/1981 | Finke et al. |
| 5,721,290 | A | 2/1998 | Eckberg et al. |
| 5,866,261 | A | 2/1999 | Kerr, III et al. |
| 6,218,445 | B1 | 4/2001 | Priou et al. |
| 6,548,568 | B1 | 4/2003 | Pinto et al. |
| 6,777,512 | B1 | 8/2004 | Sonnenschein et al. |
| 7,064,173 | B2 | 6/2006 | Rubinsztajn et al. |
| 7,906,605 | B2 | 3/2011 | Cray et al. |
| 8,048,819 | B2 * | 11/2011 | Rubinsztajn ........... C08G 59/70 502/100 |
| 8,470,899 | B2 | 6/2013 | Maliverney |
| 8,629,222 | B2 | 1/2014 | Takizawa et al. |
| 8,968,868 | B2 | 3/2015 | Yang et al. |
| 9,006,336 | B2 | 4/2015 | Yang et al. |
| 9,006,357 | B2 | 4/2015 | Yang et al. |
| 9,035,008 | B2 | 5/2015 | Yang et al. |
| 9,624,154 | B2 | 4/2017 | Blair |
| 9,856,194 | B2 | 1/2018 | Fontaine et al. |
| 10,259,908 | B2 | 4/2019 | Arkles et al. |
| 10,329,313 | B2 * | 6/2019 | Fritz-Langhals ...... C08G 77/00 |
| 12,104,019 | B2 * | 10/2024 | Courtemanche ....... C08G 77/20 |
| 12,152,148 | B2 * | 11/2024 | Wei ........................ C08G 77/12 |
| 2003/0139287 | A1 | 7/2003 | Deforth et al. |
| 2005/0136269 | A1 | 6/2005 | Doehler et al. |
| 2006/0211836 | A1 | 9/2006 | Rubinsztajn et al. |
| 2006/0241271 | A1 | 10/2006 | Rubinsztajn et al. |
| 2006/0280957 | A1 | 12/2006 | Lee et al. |
| 2006/0293172 | A1 | 12/2006 | Rubinsztajn et al. |

(Continued)

FOREIGN PATENT DOCUMENTS

CA 2894146 A1 6/2014
CN 1989178 A 6/2007

(Continued)

OTHER PUBLICATIONS

Asenjo-Sanz et al., "Zwitterionic Polymerization of Glycidyl Monomers to Cyclic Polyethers with B(C6F5)3" The Royal Society of Chemistry, 2012 pp. 1-5.
Chakraborty et al., "Catalytic Ring-Opening Polymerization of Propylene Oxide by Organoborane and Aluminum Lewis Acids" Macromolecules, 2003, pp. 5470-5481.
Grande, "Testing the functional tolerance of the Piers-Rubinsztajin reaction: a new strategy for functional silicones", Chem. Comm., 2010, pp. 4988-4990, vol. 46.
Herzberger et al., "Polymerization of Ethylene Oxide, Propylene Oxide, and Other Alkylene Oxides: Synthesis, Novel Polymer Architectures, and Bioconjugation" Chemical Reviews, American Chemical Society, 2016, pp. 2170-2243.
Kamino, et al., "Siloxane-Triarylamine Hybrids: Discrete Room Temperature Liquid Triarylamines via the Piers-Rubinsztajn Reaction" Organic Letters, 2011, pp. 154-157, vol. 13, No. 1.
Voss, et al., "Frustrated Lewis Pair Behavior of Intermolecular Amine/B(C6F5)3 Pairs" Organometallics, 2012, pp. 2367-2378, vol. 31.

(Continued)

Primary Examiner — Margaret G Moore
(74) Attorney, Agent, or Firm — Catherine U. Brown; Steven W. Mork

(57) ABSTRACT

A composition contains a mixture of silyl hydride, an alpha-beta unsaturated ester, a Lewis acid catalyst and an amine having the following formula: $R^1R^2R^3N$; where the nitrogen is not a member of an N=C—N linkage and where each of $R^1$, $R^2$, and $R^3$ is independently selected from a group consisting of hydrogen, alkyl, substituted alkyl, and conjugated moieties; and wherein at least one of $R^1$, $R^2$ and $R^3$ is a conjugated moiety connected to the nitrogen by a conjugated carbon.

19 Claims, No Drawings

(56) References Cited

U.S. PATENT DOCUMENTS

| | | | |
|---|---|---|---|
| 2007/0299231 A1* | 12/2007 | Doehler | C08G 77/38 528/29 |
| 2008/0281469 A1 | 11/2008 | Choi et al. | |
| 2009/0192282 A1 | 7/2009 | Janvikul et al. | |
| 2010/0144960 A1 | 6/2010 | Cray et al. | |
| 2013/0234070 A1 | 9/2013 | Mowrer | |
| 2015/0141570 A1 | 5/2015 | Buckanin et al. | |
| 2015/0376481 A1 | 12/2015 | Larson et al. | |
| 2016/0289388 A1 | 10/2016 | Fu et al. | |
| 2016/0319081 A1 | 11/2016 | Kanta et al. | |
| 2019/0031932 A1 | 1/2019 | Zhang et al. | |
| 2020/0157286 A1* | 5/2020 | Swier | C08L 83/04 |
| 2022/0041812 A1* | 2/2022 | Telgenhoff | C08G 77/18 |
| 2022/0162394 A1* | 5/2022 | Wei | C08G 77/12 |
| 2022/0169797 A1* | 6/2022 | Wei | B01J 31/146 |
| 2022/0169855 A1* | 6/2022 | Wei | C08L 83/04 |
| 2022/0315611 A1* | 10/2022 | Fritz-Langhals | B01J 31/0272 |

FOREIGN PATENT DOCUMENTS

| | | |
|---|---|---|
| CN | 104877310 A | 9/2015 |
| FR | 2824835 A1 | 11/2002 |
| WO | 2008125911 A2 | 10/2008 |
| WO | 2011045605 A1 | 4/2011 |
| WO | 2012060449 A1 | 5/2012 |
| WO | 2013142956 A1 | 10/2013 |
| WO | 2016097734 A1 | 6/2016 |
| WO | 2016168914 A1 | 10/2016 |
| WO | 2017100904 A1 | 6/2017 |
| WO | 2019070866 A1 | 4/2019 |
| WO | 2020247337 A1 | 12/2020 |

OTHER PUBLICATIONS

Stephan, et al., "Frustrated Lewis Pairs: Metal-free Hydrogen Activation and More" Angew. Chem. Int. Ed., 2010, pp. 46-76, vol. 49.

Berkefeld, "Tandem Frustrated Lewis Pair/Trisborane-Catalyzed Deoxygenative Hydrosilylation of Carbon Dioxide", JACS, 2010, pp. 10060-10661, vol. 132.

Brook, "New Control Over Silicone Synthesis using SiH Chemistry: The Piers-Rubinsztajn Reaction", Chem. Eur. J., 2018, pp. 8458-8469, vol. 24.

Cella, "Preparation of Polyaryloxysilanes and Polyaryloxysiloxanes by B(C6F5)3 Catalyzed Polyetherification of Dihydrosilanes and Bis-Phenols", Macromolecules, 2008, pp. 6965-6971, vol. 41.

Chen et al., "B(C6F5)3-Catalyzed Group Transfer Polymerization of Acrylates Using Hydrosilane: Polymerization Mechanism, Applicable Monomers, and Synthesis of Well-Defined Acrylate Polymers", Macromolecules, 2019, pp. 844-856, vol. 52.

Chojnowski et al., "Mechanism of the B(C6F5)3-Catalyzed Reaction of silyl Hydrides with Alkoxysilanes. Kinetic and Spectroscopic Studies" Organometallics, 2005, vol. 24, pp. 6077-6084.

Chojnowski, "Hydride Tranfer Ring-Opening Polymerization of a Cyclic Oligomethylhydrosiloxane. Route to a Polymer of Closed Multicyclic Structure", Macromolecules, 2012, vol. 45, pp. 2654-2661.

Chojnowski, "Oligomerization of Hydrosiloxanes in the Presence of Trisborane", Macromolecules, 2006, pp. 3802-3807, vol. 39.

Fawcett et al., "Rapid, Metal-Free Room Temperature Vulcanization Produces Silicone Elastomers" J. Polym. Sci. A Polym. Chem., 2013, vol. 51, pp. 644-652.

Fuchise, "B(C6F5)3-Catalyzed Group Transfer Polymerization of n-Butyl Acrylate with Hydrosilane through In Situ Formation of Initiator by 1,4-Hydrosilylation of n-Butyl Acrylate", ACS Macro Lett., 2014, pp. 1015-1019, vol. 3.

Hoque, "Polysiloxanes with Periodically Distrubuted Isomeric Double-Decker Silsesquioxane in the Main Chain", Macromolecules, 2009, pp. 3309-3315, vol. 42.

Khalimon et al., "A Photo Lewis Acid Generator (PhLAG): Controlled Photorelease of B(C6F5)3", JACS, 2012, pp. 9601-9604, vol. 134.

Khalimon, "Photo Lewis acid generators: photorelease of B(C6F5)3 and applications to catalysis", Dalt. Trans., 2015, pp. 18196-18206, vol. 44.

Kim, "Metal-Free Hydrosilylation Polymerization by Borane Catalyst", Angew. Chem. Int. Ed, 2015, pp. 14805-14809, vol. 54.

Lambert et al., "A Stable B-Silyl Carbocation", J. Am. Chem. Soc., 1996, vol. 118, pp. 7867-7868.

Lambert et al., "B-Silyl and B-Germyl Carbocations Stable at Room Temperature", J. Org. Chem., 1999, vol. 64, pp. 2729-2736.

Matsumoto et al., "One-Pot Sequence-Controlled Synthesis of Oligosiloxanes" Angew. Chem. Int. Ed. 2018, vol. 57, pp. 4637-4641.

Mitsuo, "NewHorizon of Organosilicon Chemistry", Dalt. Trans., 2010, pp. 9369-9378, vol. 39.

Momming, "Reversible Metal-Free Carbon Dioxide Binding by Frustrated Lewis Paris", Angew. Chem. Int. Ed., 2009, pp. 6643-6646, vol. 48.

Oertle et al., "Hydrosilylation of tetrasubstituted Olefins" Tetrahedron Lett., 1985, vol. 26, pp. 5511-5514.

Oestreich, "A unified survey of Si—H and H—H bond activation catalysed by electron-deficient boranes", Chem. Soc. Rev., 2015, pp. 2202-2220, vol. 44.

Perez et al., "Olefin Isomerization and Hydrosilylation Catalysis by Lewis Acidic Organofluorophosphonium Salts" J. Am. Chem. Soc., 2013, 135, 18308.

Piers et al., "Mechanistic Aspects of Bond Activation with Perfluoroarylboranes", Inorg. Chem., 2011, vol. 50, pp. 12252-12262.

Rubin et al., "Highly Efficient B(C6F5)3-Catalyzed Hydrosilylation of Olefins" J. Org. Chem, 2020, vol. 67, pp. 1936-1940.

Simonneau et al., "3-Silylated Cyclohexa-1,4-dienes as Precursors for Gaseous; Hydrosilanes: The B(C6F5)3-Catalyzed Transfer Hydrosilylation of; Alkenes" Angew. Chem. Int. Ed., 2013, vol. 52, pp. 11905-11907.

Song et al., "Lewis Acid-Catalyzed Regio- and Stereoselective Hyddrosiylation of Alkenes with Trialkylsilanes" Organometallics, 1999, vol. 18, pp. 3109-3115.

Stephan, "Frustrated Lewis Pair Chemistry: Development and Perspectives", Angew. Chem. Int. Ed., 2015, pp. 6400-6441, vol. 54.

Stephan, "Frustrated Lewis Pairs", JACS, 2015, pp. 10018-10032, vol. 137.

Yamamoto et al., "Sterochemistry of Aluminum Chloride Catalyzed Hydrosilylation of Methylcyclohexenes" Synlett, 1990, pp. 259-260.

Zhang, "Piers' borane-mediated hydrosilylation of epoxides and cyclic ethers", Chem. Commun., 2018, pp. 7243-7246, vol. 54.

Zhao et al., "N-Heterocyclic Carbene-Catalysed Hydrosilylation of Styryl and Propargylic Alcohols with Dihydrosilanes" Chem. Eur. J., 2011, vol. 17, pp. 9911-9914.

\* cited by examiner

THERMALLY INITIATED ACID CATALYZED REACTION BETWEEN SILYL HYDRIDE AND ALPHA-BETA UNSATURATED ESTERS

CROSS REFERENCE TO RELATED APPLICATIONS

This application is a U.S. national stage filing under 35 U.S.C. § 371 of PCT Application No. PCT/US20/035640 filed on 2 Jun. 2020, currently pending, which claims the benefit of U.S. Provisional Patent Application No. 62/856,777 filed 4 Jun. 2019 under 35 U.S.C. § 119 (e). PCT Application No. PCT/US20/035640 and U.S. Provisional Patent Application No. 62/856,777 are hereby incorporated by reference.

BACKGROUND OF THE INVENTION

Field of the Invention

The present invention relates to a composition comprising a silyl hydride, an alpha-beta unsaturated ester, Lewis acid catalyst and amine blocking agent for the Lewis acid catalyst. Heating the composition releases the Lewis acid catalyst from the amine blocking agent and allows it to trigger reaction between the silyl hydride and alpha-beta unsaturated ester.

INTRODUCTION

Strong Lewis acids are known catalysts for numerous reactions. For instance, the Piers-Rubinsztajn (PR) reaction between silyl hydride and silyl ether is a well-known reaction catalyzed by a strong Lewis acid, particularly tris(pentafluorophenyl) borane ("BCF"). Similar Lewis acid catalyzed reactions include rearrangement reactions between silyl hydride and polysiloxane as well as silyl hydride and silanols. See, for instance Chem. Eur. J. 2018, 24, 8458-8469.

Lewis acid catalyzed reactions, such as the PR reaction, tend to be rapid reactions even at 23 degrees Celsius (° C.). The high reactivity of these reaction systems limits their applications. The reactions may be desirable in applications such as coatings and adhesives; however, the systems must be stored in a multiple-part system in order to preclude reaction prior to application. Even so, the reaction can occur so quickly once the components are combined that there is little time to apply the reactive system. It is desirably to identify a way to control the Lewis acid catalyzed reactions and, ideally, provide them as one-part reactive systems comprising reactants and Lewis acid catalyst in a form that is shelf stable at 23° C. to allow for batch preparation, storage and usage but that can be triggered to react when desired.

Ultraviolet (UV) light sensitive blocking agents have been combined with Lewis acids in order to form blocked Lewis acids that release Lewis acid upon exposure to UV light. Upon exposure to UV light the blocking agent dissociates from the Lewis acid leaving the Lewis acid free to catalyze a reaction. A challenge with systems comprising these blocked Lewis acids is that they need to be kept in the dark in order to maintain stability. Moreover, they need to be exposed to UV light in order to initiate reaction—and for thick compositions it can be difficult to obtain UV light penetration to initiate cure quickly throughout the composition.

Notably, amines have been looked at in combination with Lewis acids in PR reaction type systems. However, amines are reported to completely suppress the reaction. See, for instance, Chem. Comm. 2010, 46, 4988-4990 at 4988. It was later identified that most amines complex essentially irreversibly with the Lewis acid catalysts, yet triaryl amines were found to be an exception and do not compromise Lewis acids in catalyzing PR reactions. See, Chem. Eur. J. 2018, 24, 8458-8469 at 8461 and 8463.

It is desirable to identify a way to prepare a one-part reactive system for a Lewis-acid catalyzed reaction that is shelf stable at 23° C. even when exposed to UV light, but that can be triggered to react when desired, preferably at a temperature below 100° C.

BRIEF SUMMARY OF THE INVENTION

The present invention provides a solution to the problem of identifying a way to prepare a one-part reactive system for a Lewis-acid catalyzed reaction that is shelf stable at 23° C. even when exposed to UV light, but that can be triggered to react when desired. In particular, the present invention provides a solution to such a problem in a reaction between silyl hydride and alpha-beta unsaturated esters. Yet more, the present invention provides such a solution that is triggered to react when heated. Compositions of the present invention simultaneously avoid gelling at 23° C. for 8 hours or more, preferably 10 hours or more while at the same time gel (or cure) within 10 minutes, preferably in 5 minutes or less, more preferably one minute or less at 90° C. Such composition are desirable because stability to gelling at 23° C. allows for forming and storing one-part reactive systems for longer periods of time, which means larger batches can be made at a time. Rapid gel/cure times at 90° C. are important in applications where exposure to elevated temperature (for example, 100° C. or higher) for extended periods of time are undesirable—such as in release coating applications where the substrate on which the composition is applied can degrade at elevated temperatures.

Hydrosilylation reactions are one method of reacting silyl hydride and unsaturated bonds in a curing reaction. Hydrosilylation typically requires the presence of a transition metal catalyst which tends to undesirably remain in the reaction product. However, it has been discovered that silyl hydride and alpha-beta unsaturated esters undergo a reductive cure reaction in the presence of a Lewis acid catalyst without the need for a transition metal catalyst. The reductive cure reaction between silyl hydride and alpha-beta unsaturated esters is an addition reaction that either adds a silicon to the carbonyl oxygen of an alpha-beta unsaturated ester to generate a new silyl ether bond or adds a silicon to the alpha-carbon of the alpha-beta unsaturated ester to form a new silicon-carbon bond. The reaction produces these addition products without generating any byproducts besides the new addition products, particularly gaseous materials. It also offers benefits of providing an addition reaction that does not require expensive platinum catalysts and that is mild and faster than platinum-catalyzed hydrosilylation.

The Lewis acid catalyzed reductive cure of silyl hydride and alpha-beta unsaturated esters can be desirable for curing siloxanes in coating, adhesive, and sealant applications. However, the reductive cure reaction tends to be rapid so it requires supplying and storing the reactive systems as two-part systems where the catalyst is kept apart from the Si—H and/or the alpha-beta unsaturated esters until reaction is desired. One-part reactive systems are more easily handled and are desirable over two-part systems, so it is desirable if reaction components could be stored together in a one-part reactive system in a way that provided shelf stability for storage but had a way to trigger the reductive cure reaction when desired to cure the system.

The present invention is a result of surprisingly and unexpectedly discovering specific amines that complex with a Lewis acid catalyst and block the activity of the Lewis acid catalyst at 23° C. but release the Lewis acid catalyst when heated. As a result, the specific amines are thermally triggerable blocking agents for the Lewis acid catalyst that block a Lewis acid catalyst at 23° C. yet release the Lewis acid catalyst to catalyze reactions at elevated temperatures such as 90° C. or higher. This is surprising in view of previous understanding in the art. As noted above, current understanding is that amines either irreversibly complex with Lewis acid catalysts or fail to compromise Lewis acid catalysts in Lewis acid catalyzed reactions. See, Chem. Comm. 2010, 46, 4988-4990 at 4988 and Chem. Eur. J. 2018, 24, 8458-8469 at 8461 and 8463.

The present discovery of amines that work as thermally triggered blocking agents for Lewis acid catalysts enables the present inventive composition which serve as one-part reactive systems comprising a Lewis acid catalyst, silyl hydride and alpha-beta unsaturated esters along with the amine blocking agent.

In a first aspect, the present invention is a composition comprising a mixture of silyl hydride, an alpha-beta unsaturated ester, a Lewis acid catalyst and an amine having the following formula: $R^1R^2R^3N$; wherein each of $R^1$, $R^2$, and $R^3$ is independently selected from a group consisting of hydrogen, alkyl, substituted alkyl, and conjugated moieties; and wherein at least one of $R^1$, $R^2$ and $R^3$ is a conjugated moiety connected to the nitrogen by a conjugated carbon.

In a second aspect, the present invention is a process comprising the steps of: (a) providing a composition of the first aspect; and (b) heating the composition to a temperature sufficient to dissociate the Lewis acid catalyst from the amine.

Compositions of the present invention are suitable, for example, as one-part reactive systems for coatings, encapsulants and adhesives.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International; EN refers to European Norm; DIN refers to Deutsches Institut für Normung; and ISO refers to International Organization for Standardization.

"Multiple" means two or more. "And/or" means "and, or as an alternative". All ranges include endpoints unless otherwise indicated. Products identified by their tradename refer to the compositions available from the suppliers under those tradenames at the priority date of this document unless otherwise stated herein.

"Siloxane" refers to a molecule that contains at least one siloxane (Si—O—Si) linkage. Desirably, the siloxane of the present invention is a "polysiloxane", which refers to a molecule that contains multiple Si—O—Si linkages. Polysiloxanes comprise siloxane units that are typically referred to as M, D, T or Q units. Standard M units have the formula $(CH_3)_3SiO_{1/2}$. Standard D units have the formula $(CH_3)_2SiO_{2/2}$. Standard T units have the formula $(CH_3)SiO_{3/2}$. Standard Q units have the formula $SiO_{4/2}$. M-type, D-type and T-type units have one or more methyl group replaced with hydrogen, or some other moiety.

"Silyl hydrides" are molecules that contain a silicon-hydrogen (Si—H) bond and can contain multiple Si—H bonds.

"Alpha-beta unsaturated ester" refers to a molecule that contains an ester group and a double bond between the alpha and beta carbons in the chain, where the carbon atoms are named based on their proximity to the carbonyl group of the ester. Acrylates and methacrylates are examples of alpha-beta unsaturated esters. The alpha-beta unsaturated ester can include silicon; such as, for example, a polysiloxane containing an alpha-beta unsaturated ester.

"(Meth)acrylate" refers to a group consisting of methacrylates and acrylates, including silicon-containing molecules containing acrylate and/or methacrylate functionalities.

"Alkyl" is a hydrocarbon radical derived from an alkane by removal of a hydrogen atom. "Substituted alkyl" is an alkyl that has an atom, or chemical moiety, other than carbon and hydrogen in place of at least one carbon or hydrogen.

"Aryl" is a radical derived from an aromatic hydrocarbon by removal of a hydrogen atom. "Substituted aryl" is an aryl that has an atom, or chemical moiety, other than carbon and hydrogen in place of at least one carbon or hydrogen.

"Conjugated" refers to a set of alternating carbon-carbon single and double and/or triple bonds whose p-orbitals are connected allowing for delocalized electrons across the carbon bonds. "Conjugated carbon" refers to a carbon in the set of alternating carbon-carbon single and double bonds that are conjugated. "Non-conjugated" refers to a carbon that is not part of a conjugated system. "Aromatic" refers to a cyclic planar conjugated molecule.

"Blocking agent" is a component that binds to a second component in order to prevent activity of the second component in some way. For example, a blocking agent on a catalyst precludes the catalyst from catalytic activity while complexed with the blocking agent.

Lewis acids catalyze a reaction between silyl hydrides and alpha-beta unsaturated esters as generally shown below:

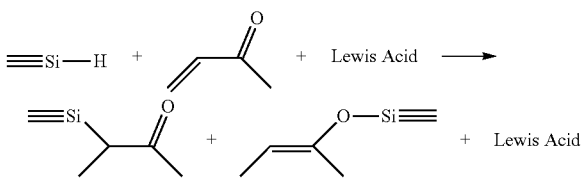

where two optional reaction products are shown. This reaction is useful to form new siloxane bonds and to form crosslinked polysiloxane systems.

This rearrangement reaction is useful to form new siloxane bonds and to form crosslinked polysiloxane systems. A particularly desirable characteristic of this reaction over other Lewis acid catalyzed reactions such as Piers-Rubinsztajn (PR) reaction is that this reaction does not typically generate volatile side products that can create bubbles when the reaction is used to cure a siloxane polymer. Hence, the reaction is ideal for making clear cured compositions and films.

The present invention includes a composition comprising a mixture of silyl hydride, an alpha-beta unsaturated ester, a Lewis acid catalyst and a particular amine. It has been discovered that the particular amines of the present invention act as blocking agents for the Lewis acid catalyst at 23° C., but release the Lewis acid catalyst at elevated temperatures (for example, 80° C. or higher, or 90° C. or higher). The compositions of the present invention are one-part Lewis acid catalyzed reactive systems that are shelf stable at 23° C. but undergo Lewis acid catalyzed reaction so as to gel at elevated temperatures in 10 minutes or less, preferably 5 minutes or less, more preferably one minute or less. Such a composition achieves an objective of the present invention to provide a "shelf stable" on-part system for a Lewis acid catalyzed reaction. "Shelf stable" means that the reaction system does not gel at 23° C. in 8 hours or less, even more preferably in 10 hours or less, yet more preferably 12 hours or less, and yet even more preferably in 24 hours or less. Evaluate shelf stability using the "23° C. Shelf Life" test in the Examples section, below. The compositions of the present invention further provide a one-part reactive system for a Lewis acid catalyze reaction that, while shelf stable at 23° C., is triggered when desired by heating. In particular, compositions of the present invention gel at 90° C. in 10 minutes or less, more preferably in 5 minutes or less and even more preferably in one minute or less. Determine rate of curing at 90° C. using the "Cure Speed at 90° C." test in the Example section, below.

Alpha-Beta Unsaturated Ester

The alpha-beta unsaturated ester has the following compositional structure (an alpha-beta unsaturated ester group) in one or more than one location in the molecule:

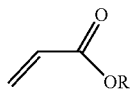

where R contains a carbon attached to the oxygen shown and can contain any other atom. As examples, R can be an alkyl, substituted alkyl, benzyl, or a polymeric group with a carbon connecting it to the oxygen.

Desirably, the alpha-beta unsaturated ester group can be part of a polymer. Such a polymer can contain one or more than one alpha-beta unsaturated ester group. The alpha-beta unsaturated ester is desirable selected from (meth)acrylates, that is, compounds having an acrylate and/or methacrylate group as shown below, where the (meth)acrylate group is attached to the polymer through the oxygen having a single bond:

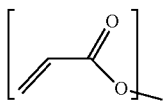 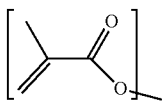

Acrylate Group     Methacrylate Group

The alpha-beta unsaturated ester group can be connected to a silicon atom, which is typically part of a siloxane group (Si—O—Si) or a polysilane group (Si—Si), which itself is typically part of a polysiloxane chain. When the alpha-beta unsaturated ester group connects to a silicon atom the connection between the oxygen and silicon is through one or multiple (generally 2 or more, 3 or more while at the same time 6 or fewer, 5 or fewer, even 4 or fewer) carbon atoms, through the single-bonded oxygen atom in the alpha-beta unsaturated ester group.

Examples of suitable alpha-beta unsaturated esters include methacrylate-pendant polysiloxanes such as those having the formula $MD_xD^{MA}_yM$, where $D^{MA}$ is a D-type siloxane unit where one of the methyl groups of a standard D siloxane unit is replaced with methacryloxypropyl:

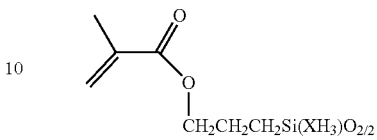

$CH_2CH_2CH_2Si(XH_3)O_{2/2}$ and where subscript x is the average number of D units per molecule and is a value of 10 or more, 20 or more, 30 or more, 40 or more, 50 or more, 60 or more, 70 or more, 80 or more, 90 or more, 100 or more, 110 or more, 120 or more, 130 or more, 140 or more, 150 or more, 160 or more, 170 or more, 180 or more, 190 or more and even 200 or more while at the same time is generally 1000 or less, 800 or less, 600 or less, 400 or less, or even 200 or less; and subscript y is the average number of $D^{MA}$ siloxane units per molecule and is a value of one or more, 2 or more, 3 or more, 4 or more, 5 or more, 6 or more, 7 or more, 8 or more, 9 or more, 10 or more, 12 or more, 14 or more, 16 or more, 18 or more even 20 or more and at the same time is generally 50 or less, 40 or less, 30 or less, 20 or less or even 10 or less. Determine subscript values by $^{29}Si$ nuclear magnetic resonance spectroscopy.

Examples of suitable alpha-beta unsaturated esters that are methacryloxypropyl terminated polydimethylsiloxanes include those available from Gelest under the trade names DMS-R11 (125-250 cSt), DMS-R18 (50-90 cSt), DMS-R11 (8-14 cSt), and DMS-R31 (1,000 cSt) as well as acrylate functional silane available from Gelest under the name SIVATE™ A200.

Typically, the concentration of alpha-beta unsaturated ester in the composition is 70 weight-percent (wt %) or more, 75 wt % or more, 80 wt % or more, 85 wt % or more, even 90 wt % or more while at the same time is typically 90 wt % or less, 85 wt % or less, 80 wt % or less, or even 75 wt % or less based on the combined weight of silyl hydride, alpha-beta unsaturated ester, Lewis acid catalyst and amine.

Silyl Hydride

The silyl hydride contains one, preferably more than one, Si—H bond. The Si—H bond is typically part of polysilane (molecule containing multiple Si—H bonds) or polysiloxane. Silyl hydrides containing multiple Si—H bonds are desirable as crosslinkers in compositions of the present invention because they are capable of reacting with multiple siloxane linkages.

The silyl hydride of the present invention can be polymeric. The silyl hydride can be linear, branched or can contain a combination of linear and branched silyl hydrides. The silyl hydride can be a polysilane, a polysiloxane or a combination of polysilane and polysiloxanes.

Desirably, the silyl hydride is a polysiloxane molecule with one or more than one Si—H bond. If the silyl hydride is a polysiloxane, the Si—H bond is on the silicon atom of an M-type or D-type siloxane unit. The polysiloxane can be linear and comprise only M type and D type units. Alternatively, the polysiloxane can be branched and contain T type and/or Q units.

Examples of suitable silyl hydrides include pentamethyldisiloxane, bis(trimethylsiloxy)methyl-silane, tetramethyldisiloxane, $D^H$ containing poly(dimethylsiloxanes) (for example, MD$^H{}_{65}$M), tetramethycyclotetrasiloxane, and hydride terminated poly(dimethylsiloxane) such as those available from Gelest under the tradenames: DMS-H03, DMS-H25, DMS-H31, and DMS-H41.

The concentration of silyl hydride is typically sufficient to provide a molar ratio of Si—H groups to the combination of alpha-beta unsaturated ester groups that is 0.2 or more, 0.5 or more, 0.7 or more, 0.8 or more, 0.9 or more, 1.0 or more 1.2 or more, 1.4 or more, 1.6 or more, 1.8 or more, 2.0 or more, 2.2 or more, even 2.5 or more while at the same time is typically 5.0 or less, 4.5 or less, 4.0 or less, 3.5 or less, 3.0 or less, 2.8 or less, 2.5 or less, 2.3 or less, 2.0 or less, 1.8 or less, 1.6 or less, 1.4 or less, 1.2 or less or even 1.0 or less.

Either the alpha-beta unsaturated ester or the silyl hydride (or both) can serve as crosslinkers in the reaction. A crosslinker has at least two reactive groups per molecule and reacts with two different molecules through those reactive groups to cross link those molecules together. Increasing the linear length between reactive groups in a crosslinker tends to increase the flexibility in the resulting crosslinked product. In contrast, shortening the linear length between reactive groups in a crosslinker tends to reduce the flexibility of a resulting crosslinked product. Generally, to achieve a more flexible crosslinked product a linear crosslinker is desired and the length between reactive sites is selected to achieve desired flexibility. To achieve a less flexible crosslinked product, shorter linear crosslinkers or even branched crosslinkers are desirable to reduce flexibility between crosslinked molecules.

The silyl hydride can be the same molecule as the alpha-beta unsaturated ester—that is, a single molecule containing both an alpha-beta unsaturated ester and silyl hydride functionality can serve as both the silyl hydride and alpha-beta unsaturated ester. Alternatively, the silyl hydride can be a different molecule from the alpha-beta unsaturated ester. The silyl hydride can be free of alpha-beta unsaturated ester groups. The alpha-beta unsaturated ester can be free of silyl hydride groups.

The composition (and reaction process) of the present invention can comprise more than one silyl hydride, more than one alpha-beta unsaturated ester and/or more than one component that serves as both a silyl hydride and alpha-beta unsaturated ester.

Typically, the concentration of silyl hydride in the composition is 5 wt % or more, 10 wt % or more, 15 wt % or more, 20 wt % or more, even 25 wt % or more while at the same time is typically 30 wt % or less, 25 wt % or less, 20 wt % or less, 15 wt % or less or even 5 wt % or less based on the combined weight of silyl hydride, alpha-beta unsaturated ester, Lewis acid catalyst and amine.

Lewis Acid Catalyst

The Lewis acid catalyst is desirably selected from a group consisting of aluminum alkyls, aluminum aryls, aryl boranes, aryl boranes including triaryl borane (including substituted aryl and triaryl boranes such a tris(pentafluorophenyl)borane), boron halides, aluminum halides, gallium alkyls, gallium aryls, gallium halides, silylium cations and phosphonium cations. Examples of suitable aluminum alkyls include trimethylaluminum and triethylaluminum. Examples of suitable aluminum aryls include triphenyl aluminum and tris-pentafluorophenyl aluminum. Examples of triaryl boranes include those having the following formula:

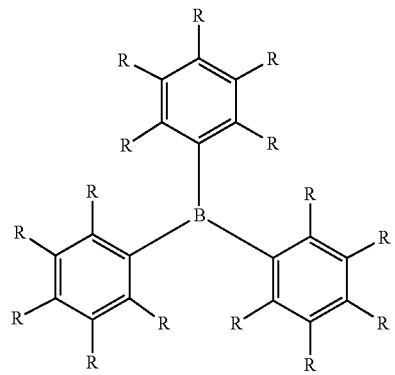

where R is independently in each occurrence selected from H, F, Cl and CF$_3$. Examples of suitable boron halides include (CH$_3$CH$_2$)$_2$BCl and boron trifluoride. Examples of suitable aluminum halides include aluminum trichloride. Examples of suitable gallium alkyls include trimethyl gallium. Examples of suitable gallium aryls include triphenyl gallium. Examples of suitable gallium halides include trichlorogallium. Examples of suitable silylium cations include (CH$_3$CH$_2$)$_3$Si$^+$X$^-$ and Ph$_3$Si$^+$X$^-$. Examples of suitable phosphonium cations include F—P(C$_6$F$_5$)$_3{}^+$X$^-$.

The Lewis acid is typically present in the composition at a concentration of 10 weight parts per million (ppm) or more, 50 ppm or more, 150 ppm or more, 200 ppm or more, 250 ppm or more, 300 ppm or more, 350 ppm or more 400 ppm or more, 450 ppm or more, 500 ppm or more, 550 ppm or more, 600 ppm or more, 70 ppm or more 750 ppm or more, 1000 ppm or more 1500 ppm or more, 2000 ppm or more, 4000 ppm or more, 5000 ppm or more, even 7500 ppm or more, while at the same time is typically 10,000 or less, 7500 ppm or les, 5000 ppm or less, 1500 µm or less, 1000 ppm or less, or 750 ppm or less based on the combined weight of silyl hydride and alpha-beta unsaturated ester.

Amine

The selection of amine is important because it must complex with the Lewis acid at 23° C. to inhibit catalytic activity of the Lewis acid in a reaction composition at that temperature, yet must release the Lewis acid at an elevated temperature so as to rapidly (within 10 minutes or less, preferably 5 minutes or less, more preferably one minute less) gel the reaction composition at 90° C. Reaction compositions can be monitored at 23° C. and 90° C. to determine gel times (see Example section below). Alternatively, or additionally, one can characterize by differential scanning calorimetry the temperature at which the curing reaction exotherm occurs (Tpeak, see Example section below for procedure). The Tpeak value for a composition should increase relative to the Tpeak for an identical amine-free composition if the proper amine is present, but desirably remains below 130° C., preferably below 120° C., more preferably below 110° C. so as to reflect dissociation sufficient to rapidly cure at 90° C.

Amines have been reported as irreversibly complexing with Lewis acid catalysts, except for triaryl amines which are reported to not compromise Lewis acid catalysts. Without being bound by theory, it seems the present invention is partly the result of discovering that by having one or more conjugated moeity attached the nitrogen of an amine through a conjugated carbon, the conjugated moiety helps delocalize the free electrons of the amine and weaken it as a Lewis base. As a result, amines having at least one conjugated moiety attached to the nitrogen of the amine through a conjugated carbon have been discovered to complex with and block Lewis acid catalyst at 23° C. so as to preclude gelling of a reaction composition at 23° C. in 4 hours or less, preferably 8 hours or less, more preferably 10 hours or less, yet more preferably 12 hours less, while at the same time complexes weakly enough so as to release the Lewis acid catalyst upon heating to 90° C. so as to gel the composition in 10 minutes or less, preferably 5 minutes or less, more preferably one minute or less.

To be a sufficiently weak Lewis base, the amines of the present invention have at least one, preferably at least two, and can have three conjugated moieties attached to the nitrogen of the amine through a conjugated carbon so that the free electron pair on the nitrogen can dissociate with the conjugated moiety and weaken the amine as a Lewis base. Preferably, the conjugated moieties are aromatic moieties.

Triaryl amines have three aromatic conjugated moieties attached to the amine nitrogen each through a conjugated carbon. As a result, triaryl amines are examples of amines that optimally delocalize the nitrogen free electrons to create a weak Lewis base. That is consistent with prior art reporting that triaryl amines do not compromise Lewis acid catalysts. Nonetheless, triaryl amines have been surprisingly discovered to have a blocking effect on Lewis acid catalysts at 23° C. and inhibit Lewis acid catalyzed reaction at 23° C. and are in scope of the broadest scope of the amines suitable for use in the present invention. Desirably, the amines of the present invention are stronger Lewis bases than triaryl amines in order to achieve greater blocking effect (hence, longer shelf stability) at 23° C. In that regard, while the amine of the present invention can have one, two or three conjugated moieties attached to the nitrogen of the amine through a conjugated carbon, it is desirable that the amine is other than a triaryl amine. Compositions of the present invention can be free of triarylamines.

The ability of a conjugated moiety to weaken the strength of the amine as a Lewis base is further tunable with substituent groups that can be attached to the conjugated moiety. Including electron withdrawing groups (such as halogens) on the conjugated moiety will further draw the nitrogen electrons into the delocalized conjugated system and weaken the strength of the amine as a Lewis base. Including electron donating groups on the conjugated moiety has the opposite effect and increases the resulting amine strength as a Lewis base relative to the same amine with the conjugated moiety without the electron donating group(s).

The amine needs to be strong enough to bind to and block the Lewis acid catalyst at 23° C. in order to achieve shelf stability. The amine will release the acid at lower temperatures if it is a weaker Lewis base than if it were a stronger Lewis base. Hence, selection of the moieties attached to the nitrogen of the amine can be selected to achieve shelf stability and reactivity at a desired temperature.

It has further been discovered that suitable amines must have the amine nitrogen that is not a member of an N=C—N linkage such as in amidines, guanidines and N-methylimidazole. Desirably, the composition is free of amines having an N=C—N linkage. For example, the composition can be free of amidines and guanidines.

In general, the amine has the following formula: $R^1R^2R^3N$; where the nitrogen is not a member of an N=C—N linkage and where each of $R^1$, $R^2$, and $R^3$ is independently selected from a group consisting of hydrogen, alkyl, substituted alkyl, and conjugated moieties; and wherein at least one of $R^1$, $R^2$ and $R^3$ is a conjugated moiety connected to the nitrogen by a conjugated carbon. One, two or three of $R^1$, $R^2$ and $R^3$ can be a conjugated moiety connected to the nitrogen by a conjugated carbon. Desirably, the conjugated moiety is an aromatic moiety.

Examples of suitable amines for use in the present invention include any one or any combination of more than one amine selected from a group consisting of: aniline, 4-methylaniline, 4-fluoroaniline, 2-chloro-4-fluoroaniline, diphenylamine, diphenylmethylamine, triphenylamine, 1-naphthylamine, 2-naphthylamine, 1-aminoanthracene, 2-aminoanthracene, 9-aminoanthracene, β-aminostyrene, 1,3,5-hexatrien-1-amine, N,N-dimethyl-1,3,5-hexatrien-1-amine, 3-amino-2-propenal and 4-amino-3-buten-2-one.

The concentration of amine in the composition is at least at a molar equivalent to the concentration of Lewis acid catalyst so as to be able to complex with and block all of the Lewis acid catalyst at 23° C. The concentration of amine can exceed the molar concentration of Lewis acid catalyst, but preferably is present at a concentration of 110 mole-percent (mol %) or less, prefer 105 mol % or less, more preferably 103 mol % or less and most preferably 101 mol % or less while also being present at 100 mol % or more relative to total moles of Lewis acid catalyst.

The amine and Lewis acid form a complex in the composition that blocks the Lewis acid from catalyzing a reaction between the other composition components sufficiently to be shelf stable at 23° C. Upon heating, the amine releases the Lewis acid to allow the Lewis acid to catalyze a reaction.

Optional Components

Compositions of the present invention can consist of the silyl hydride, the alpha-beta unsaturated ester, the Lewis acid catalyst and the amine. Alternatively, the compositions of the present invention can further comprise one or a combination of more than one optional component. Optional components are desirably present at a concentration of 50 wt % or less, 40 wt % or less, 30 wt % or less, 20 wt % or less, 10 wt % or less, 5 wt % or less, or even one wt % or less based on composition weight.

Examples of possible optional components include one or a combination of more than one component selected from a group consisting of hydrocarbyl solvents (typically at a concentration of 10 wt % or less, 5 wt % or less, even one wt % or less based on composition weight), pigments such as carbon black or titanium dioxide, fillers such as metal oxides including $SiO2$ (typically at a concentration of 50 wt % or less based on composition weight), moisture scavengers, fluorescent brighteners, stabilizers (such as antioxidants and ultraviolet stabilizers), and corrosion inhibitors. The compositions of the present invention also can be free of any one or any combination of more than one such additional components.

Notably, the composition of the present invention can contain one wt % or less, 0.5 wt % or less water relative to composition weight. Desirably, the composition is free of water.

Reaction Process

The present invention includes a chemical reaction process comprising the steps of: (a) providing a composition of the present invention; and (b) heating the composition to a temperature sufficient to dissociate the Lewis acid catalyst from the amine.

Step (a) can comprise mixing together an amine, Lewis acid catalyst, a silyl hydride and an alpha-beta unsaturated ester. However, the Lewis acid catalyst and amine are combined so that the amine can complex with and block the catalytic activity of the Lewis acid prior to combining them with both of silyl hydride and alpha-beta unsaturated ester. It is possible to prepare the Lewis acid/amine complex in the presence of one of the reactants (that is, the silyl hydride or the alpha-beta unsaturated ester) provided the Lewis acid does not catalyze reaction with the one reactant. The amine and Lewis acid can be combined in a solvent, such as toluene, to form the blocked Lewis acid complex and then that complex can be combined with the silyl hydride and alpha-beta unsaturated ester.

Step (b) generally requires heating the composition to a temperature of 80° C. or higher, preferably 90° C. or higher while at the same time generally can be accomplished by heating to a temperature of 300° C. or lower, 250° C. or lower, 200° C. or lower, 150° C. or lower, and can be 100° C. or lower.

The compositions of the present invention are particular useful as coatings or encapsulants. The compositions can also be useful form forming molded articles. In such an applications the process of the present invention can further comprise applying the composition to a substrate after step (a) and before or during step (b)

EXAMPLES $MD^{H}_{65}M$ Silyl Hydride. Fit a 3-necked flask with a mechanical stirrer and add 40 grams (g) deionized water, 10 g heptane and 0.05 g tosylic acid. Add to this dropwise while stirring a mixture of 200 g methyldichlorosilane and 10 g trimethylchlorosilane over 30 minutes. Stir for an additional 60 minutes at 23° C. Wash the reaction solution three times with 50 milliliters (mL) deionized water each time. Dry the solution with anhydrous sodium sulfate and filter through activated carbon. Remove volatiles by Rotovap to obtain $MD^{H}_{65}M$ Silyl Hydride.

$MD_{166}D^{MA}_{14}M$ Alpha-Beta Unsaturated Ester. Equip a 4-neck one-liter flask with a thermal couple, mechanical stirrer, a Dean Stark trap adapted to water cooled condenser and a nitrogen bubbler. Add to the flask 558.9 grams (g) of silanol terminated polydimethylsiloxane (XIAMETER™ PMX-0930 available from The Dow Chemical Company), 18.5 g of 3-methacryloxypropylmethyldimethoxysilane, 6.1 g of Dow Corning 200 Fluid (0.65 cSt) and 121 g of heptane. With vigorous stirring add 0.35 mL triflic acid. Apply heat to raise the temperature to 73° C. Collect water, methanol and heptane in the Dean Stark trap. The refluxing temperature gradually rises to 90° C. after about one hour. Add 11.0 g of water to the flask and continue azeotropic distillation. Refluxing temperature rises to 96° C. after approximately 2 hours. Remove the heat source and ad 22.8 g of calcium carbonate and 50 g of sodium sulfate to the flask. Allow the flask contents to cool to 23° C. After stirring for 3 hours, filter the contents through a 0.45 micrometer filter membrane. Rotovap the filtrate at 80° C. and less than one torr pressure for one hour to obtain 586.9 g of $MD_{166}D^{MA}_{14}M$ Alpha-Beta Unsaturated Ester as a clear colorless liquid product. $MD_{166}D^{MA}_{14}M$ Alpha-Beta Unsaturated Ester has the following structure:

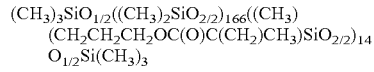

$MD_{50}D^{MA}_{2.6}M$ Alpha-Beta Unsaturated Ester. Equip a 4-neck one-liter flask with a thermal couple, mechanical stirrer, a Dean Stark trap adapted to water cooled condenser and a nitrogen bubbler. Add to the flask 466.6 g of silanol terminated polydimethylsiloxane (XIAMETER™ PMX-0930 available from The Dow Chemical Company), 75.8 g of methacryloxypropylmethyldimethoxysilane, 21.4 g Dow Corning 200 Fluid (0.65 cSt) and 124 g of heptane. With vigorous stirring add 0.40 mL triflic acid. Apply heat to raise the temperature to 76° C. Collect water, methanol and heptane in the Dean Stark trap. The refluxing temperature gradually rises to 117° C. after about 4 hours. Remove the heat source and ad 15.6 g of calcium carbonate and 32 g of sodium sulfate to the flask once the contents cool to 101° C. Allow the flask contents to cool to 23° C. After stirring for 2 hours, filter the contents through a 0.45 micrometer filter membrane. Rotovap the filtrate at 80° C. and less than one torr pressure for 30 minutes to obtain 456.7 g of $MD_{50}D^{MA}_{2.6}M$ Alpha-Beta Unsaturated Ester as a clear colorless liquid product.

$MD_{182}D^{MA}_{3}M$ Alpha-Beta Unsaturated Ester. Equip a 4-neck one-liter flask with a thermal couple, mechanical stirrer, a Dean Stark trap adapted to water cooled condenser and a nitrogen bubbler. Add to the flask 616.6 g of silanol terminated polydimethylsiloxane (XIAMETER™ PMX-0930 available from The Dow Chemical Company), 29.5 g of methacryloxypropylmethyldimethoxysilane, 6.1 g Dow Corning 200 Fluid (0.65 cSt) and 75 g of heptane. With vigorous stirring add 0.35 mL triflic acid. Apply heat to raise the temperature to 85° C. Collect water, methanol and heptane in the Dean Stark trap. The refluxing temperature gradually rises to 90° C. after about one hour. Add 8.8 g of water to the flask and continue azeotropic distillation. The refluxing temperature rises to 99° C. after approximately 2 hours. Remove the heat source and ad 20 g of calcium carbonate and 50.8 g of sodium sulfate to the flask. Allow the flask contents to cool to 23° C. After stirring for 3 hours, filter the contents through a 0.45 micrometer filter membrane. Rotovap the filtrate at 80° C. and less than one torr pressure for one hour to obtain 583.6 g of $MD_{182}D^{MA}_{3}M$ Alpha-Beta Unsaturated Ester as a clear colorless liquid product.

$M^{Vi}D_{78}M^{Vi}$. This material is commercially available as DMS-V21 from Gelest.

Catalyst Solution. Prepare a catalyst solution by combining 5 wt % BCF in toluene with 5 wt % of specified amine (see Table 1) in toluene at amounts sufficient to provide equi-molar amounts of BCF and amine (1:1 molar ratio) and approximately 12 grams of final solution. Sonicate the final solution for 30 seconds and let sit for 12 hours at 23° C. Add 0.5-1.0 gram of tetrahydrofuran to the final solution to help dissolve the BCF-amine complex and form the catalyst solution for use in the example compositions.

23° C. Shelf Life. Prepare the composition in a vial and then seal the vial and store at 23° C. Check the flowability of the contents of the vial at by inverting the vials and watching the contents to determine if it flows. Check flowability on hour intervals for 8 hours and after than on 24 hour intervals. Record the time at which gelation occurs as evidenced by a failure of the vial contents to flow in 1-2 seconds upon inverting. The time at which gelation occurs is the "23° C. Shelf Life".

Cure Speed at 90° C. The Cure Speed at 90° C. is the time it takes to form a gel or cured film free of a tacky surface at 90° C. Coat a 125 micrometer film of a composition on glassine paper substrate. Place the film in an oven at 90° C. Check the films for tackiness every 30 seconds. The time required to achieve a tack-free film is the Cure Speed at 90° C.

Tpeak. Tpeak is the temperature where there is maximum reaction exotherm in a reaction system. Determine Tpeak by differential scanning calorimetry (DSC) for a sample composition. Characterize by DSC by loading a 10 milligram sample of a composition into a DSC pan and conducting DSC using a temperature ramp from 10° C. to 250° C. at a rate of 10° C. per minute. Tpeak is the temperature at which maximum exotherm is evident in the DSC curve

Comparative Example (Comp Ex) A: Lewis Acid without Blocking Agent

Combine in a 10 g dental cup 2 grams $MD_{166}D^{MA}{}_{14}M$, 0.348 grams $MD^{H}{}_{65}M$ Silyl Hydride and a solution of 500 ppm BCF dissolved in a minimal amount of toluene. The molar ratio of SiH functionality to alpha-beta unsaturated ester groups is 3:1. 23° C. Shelf Life is 4 hours and 90° C. Cure Speed is 5 minutes. Results are in Table 1. Comparative Example (Comp Ex) A serves as a reference for uninhibited curing. NOTE: concentrations of BCF in this and the other samples below is relative to total sample (composition) weight.

Comp Exs B-D: Lewis Acid with Amine Blocking Agent without Aromatic Carbon Bonded to Amine Nitrogen Prepare Comp Exs B-D in like manner as Comp Ex A except use a catalyst solution containing 500 ppm BCF complexed with an equal molar amount of amine inhibitor (see Table 1). The amine inhibitors lack a conjugated carbon attached the amine nitrogen. Characterize 23° C. Shelf Life and 90° C. Cure Speed. Results are in Table 1.

Exs 1-3: Lewis Acid with Amine Blocking Agent with Aromatic Carbon Bonded to Amine Nitrogen Prepare Exs 1-3 in like manner as Comp Ex A except use the alpha-beta unsaturated ester identified in Table 1 and a catalyst solution containing 500 ppm BCF complexed with an equal molar amount of amine inhibitor (see Table 1). The amine inhibitors contain a conjugated carbon attached the amine nitrogen. Characterize 23° C. Shelf Life and 90° C. Cure Speed. Results are in Table 1.

Comp Ex E: Lewis Acid with Amine Blocking Agent with Aromatic Carbon Bonded to Amine Nitrogen; Vinyl Reactant Other than Alpha-Beta Unsaturated Ester Prepare Comp Ex E in like manner as Ex 1 except use $M^{Vi}D_{78}M^{Vi}$ instead of $MD_{166}D^{MA}{}_{14}M$. Comp Ex E does not contain Alpha-beta unsaturated ester reactant, but does contain terminal final functionalized siloxanes to see if they will react like alpha-beta unsaturated esters. The amine inhibitors contain a conjugated carbon attached the amine nitrogen. Characterize 23° C. Shelf Life and 90° C. Cure Speed. Results are in Table 1.

Comp Ex F: Lewis Acid with Amine Blocking Agent with Aromatic Carbon Bonded to Amine Nitrogen; Alpha-Beta Unsaturated Ester without Silyl Hydride Prepare Comp Ex F in like manner as Comp Ex A except use do not include the $MD^{H}{}_{65}M$ Silyl Hydride. This Comp Ex explores the necessity of including silyl hydride. Characterize 23° C. Shelf Life and 90° C. Cure Speed. Results are in Table 1.

TABLE 1

| Sample | Reactants | Inhibitor | Tpeak (° C.) | 23° C. Shelf Life | 90° C. Cure Speed |
|---|---|---|---|---|---|
| Comp Ex A | $MD_{166}D_{14}{}^{MA}M$ and $MD_{65}{}^{H}M$ | (none) | 92 | 4 hours | 5 minutes |
| Comp Ex B | $MD_{166}D_{14}{}^{MA}M$ and $MD_{65}{}^{H}M$ | butyl amine | 196 | >5 days | >1 hour |
| Comp Ex C | $MD_{166}D_{14}{}^{MA}M$ and $MD_{65}{}^{H}M$ | N-Methylimidazole | 220 | >5 days | >1 hour |
| Comp Ex D | $MD_{166}D_{14}{}^{MA}M$ and $MD_{65}{}^{H}M$ | 1,8-diazabicyclo[5.4.0]undec-7-ene | 173 | >5 days | >1 hour |
| Ex 1 | $MD_{166}D_{14}{}^{MA}M$ and $MD_{65}{}^{H}M$ | Aniline | 109 | >5 days | 3 minutes |
| Ex 2 | $MD_{50}D_{2.6}{}^{MA}M$ and $MD_{65}{}^{H}M$ | Aniline | 99 | >5 days | 6 minutes |
| Ex 3 | $MD_{182}D_{3}{}^{MA}M$ and $MD_{65}{}^{H}M$ | Aniline | ND* | 1 day | 1 minute |
| Comp Ex E | $M^{Vi}D_{78}M^{Vi}$ and $MD_{65}{}^{H}M$ | Aniline | ND* | >10 days | >1 hour |
| Comp Ex F | $MD_{166}D_{14}{}^{MA}M$ | (none) | ND* | >5 days | >1 hour |

*ND means not determined - either it was too high or otherwise unable to be measured.

Comp Ex A reveals that a composition of silyl hydride and alpha-beta unsaturated ester in the presence of an unblocked Lewis acid has insufficient 23° C. Shelf Life to qualify as Shelf Stable (requires at least 8 hour 23° C. Shelf Life to qualify as "shelf stable").

Comp Exs B-D reveal that blocking the Lewis acid with an amine lacking a conjugated carbon bound to the amine nitrogen and/or having a N=C—N linkage is too strongly blocked to have the desired 90° C. Cure Speed of less than 10 minutes or less.

Exs 1-3 reveal that blocking the Lewis acid with an amine having a conjugated carbon bound to the amine nitrogen provides a composition is that is Shelf Stable and has a 90° C. Cure Speed well below the 10 minute or less requirement.

Comp Ex E reveals that alpha-beta unsaturated esters are essential components to this composition and that just having terminal vinyl functionalities instead of alpha-beta unsaturated ester groups results in a composition that is too stable to achieve the desired 90° C. Cure Speed of 10 minutes or less.

Comp Ex F reveals that the silyl hydride is also an essential component of the composition and that just having the alpha-beta unsaturated ester—even without an inhibitor on the Lewis acid—is too stable to achieve the desired 90° C. Cure Speed of 10 minutes or less.

What is claimed is:

1. A composition comprising a mixture of silyl hydride, an alpha-beta unsaturated ester, a Lewis acid catalyst and an amine having the following formula: $R^1R^2R^3N$; where the nitrogen is not a member of an N=C—N linkage and where each of $R^1$, $R^2$, and $R^3$ is independently selected from a group consisting of hydrogen, alkyl, substituted alkyl, and conjugated moieties; and wherein at least one of $R^1$, $R^2$ and $R^3$ is a conjugated moiety connected to the nitrogen by a conjugated carbon.

2. The composition of claim 1, wherein the conjugated moiety is an aromatic moiety.

3. The composition of claim 1, wherein at least two of $R^1$, $R^2$, and $R^3$ are conjugated moieties attached to N through a conjugated carbon.

4. The composition of claim 1, wherein the Lewis acid catalyst is selected from a group consisting of aluminum alkyls, aluminum aryls, aryl boranes, fluorinated aryl borane, boron halides, aluminum halides, gallium alkyls, gallium aryls, gallium halides, silylium cations and phosphonium cations.

5. The composition of claim 4, wherein the Lewis acid catalyst is a fluorinated aryl borane.

6. The composition of claim 1, wherein the silyl hydride and the alpha-beta unsaturated ester are the same molecule.

7. The composition of claim 1, wherein the composition is free of a UV light sensitive blocking agent for the Lewis acid catalyst.

8. A process comprising the steps of:
   (a) providing a composition comprising a mixture of silyl hydride, an alpha-beta unsaturated ester, a Lewis acid catalyst and an amine having the following formula: $R^1R^2R^3N$; where the nitrogen is not a member of an N=C—N linkage and where each of $R^1$, $R^2$, and $R^3$ is independently selected from a group consisting of hydrogen, alkyl, substituted alkyl, and conjugated moieties; and wherein at least one of $R^1$, $R^2$ and $R^3$ is a conjugated moiety connected to the nitrogen by a conjugated carbon; and
   (b) heating the composition to a temperature sufficient to dissociate the Lewis acid catalyst from the amine.

9. The process of claim 8, wherein step (a) comprises mixing together an amine, Lewis acid catalyst, a silyl hydride and an alpha-beta unsaturated ester provided the Lewis acid catalyst and amine are combined so that the amine can complex with and block the catalytic activity of the Lewis acid prior to combining them with both of silyl hydride and alpha-beta unsaturated ester.

10. The process of claim 8, wherein the process further includes a step of applying the composition to a substrate or placing the composition in a mold after step (a) and before or during step (b).

11. The process of claim 9, wherein after step (a) and prior to step (b) the composition is applied to a substrate or placed in a mold.

12. The composition of claim 2, wherein the silyl hydride and the alpha-beta unsaturated ester are the same molecule.

13. The composition of claim 3, wherein the silyl hydride and the alpha-beta unsaturated ester are the same molecule.

14. The composition of claim 4, wherein the silyl hydride and the alpha-beta unsaturated ester are the same molecule.

15. The composition of claim 5, wherein the silyl hydride and the alpha-beta unsaturated ester are the same molecule.

16. The composition of claim 2, wherein the composition is free of a UV light sensitive blocking agent for the Lewis acid catalyst.

17. The composition of claim 3, wherein the composition is free of a UV light sensitive blocking agent for the Lewis acid catalyst.

18. The composition of claim 4, wherein the composition is free of a UV light sensitive blocking agent for the Lewis acid catalyst.

19. The composition of claim 6, wherein the composition is free of a UV light sensitive blocking agent for the Lewis acid catalyst.

\* \* \* \* \*